No. 611,317. Patented Sept. 27, 1898.
T. C. HEFEL.
FILTERING PLANT FOR WATERWORKS.
(Application filed Feb. 7, 1898.)
(No Model.) 4 Sheets—Sheet 1.

WITNESSES:
INVENTOR
Toney C. Hefel
BY
ATTORNEY.

No. 611,317. Patented Sept. 27, 1898.
T. C. HEFEL.
FILTERING PLANT FOR WATERWORKS.
(Application filed Feb. 7, 1898.)
(No Model.) 4 Sheets—Sheet 2.

WITNESSES
INVENTOR
Toney C. Hefel
BY
ATTORNEY.

No. 611,317. Patented Sept. 27, 1898.
T. C. HEFEL.
FILTERING PLANT FOR WATERWORKS.
(Application filed Feb. 7, 1898.)
(No Model.) 4 Sheets—Sheet 3.

WITNESSES:
Thos. L. Ryan
H. H. Wolf

INVENTOR.
Toney C. Hefel
BY
Wm. DuVal Brown
ATTORNEY.

No. 611,317. Patented Sept. 27, 1898.
T. C. HEFEL.
FILTERING PLANT FOR WATERWORKS.
(Application filed Feb. 7, 1898.)

(No Model.) 4 Sheets—Sheet 4.

WITNESSES:
Thos. L. Ryan
H. H. Wolf

INVENTOR
Toney C. Hefel
BY
Wm. DuVal Brown
ATTORNEY.

UNITED STATES PATENT OFFICE.

TONEY C. HEFEL, OF MUNCIE, INDIANA, ASSIGNOR OF ONE-HALF TO CHARLES H. RUSSEY, OF SAME PLACE.

FILTERING PLANT FOR WATERWORKS.

SPECIFICATION forming part of Letters Patent No. 611,317, dated September 27, 1898.

Application filed February 7, 1898. Serial No. 669,361. (No model.)

*To all whom it may concern:*

Be it known that I, TONEY C. HEFEL, a citizen of the United States, residing at Muncie, in the county of Delaware and State of Indiana, have invented a new and useful Improvement in Filtering Plants for Waterworks, of which the following is a specification.

This invention relates to a new and useful improvement in filtering plants for waterworks; and it consists in the construction and arrangement of parts hereinafter described, and definitely pointed out in the claims.

The aim and purpose of this invention are to construct a filtering plant which is capable of filtering a large amount of water with the least possible expense.

A further object is to construct a filtering plant which can be easily and thoroughly cleaned without removing the filtering material and which is provided with by-paths, so that the water can be led around the plant direct to the clear-water basin when desired.

These and other objects not hereinbefore specified can be accomplished by the construction illustrated in the accompanying drawings, wherein like letters of reference indicate corresponding parts in the several views, and in which—

Figure 1:
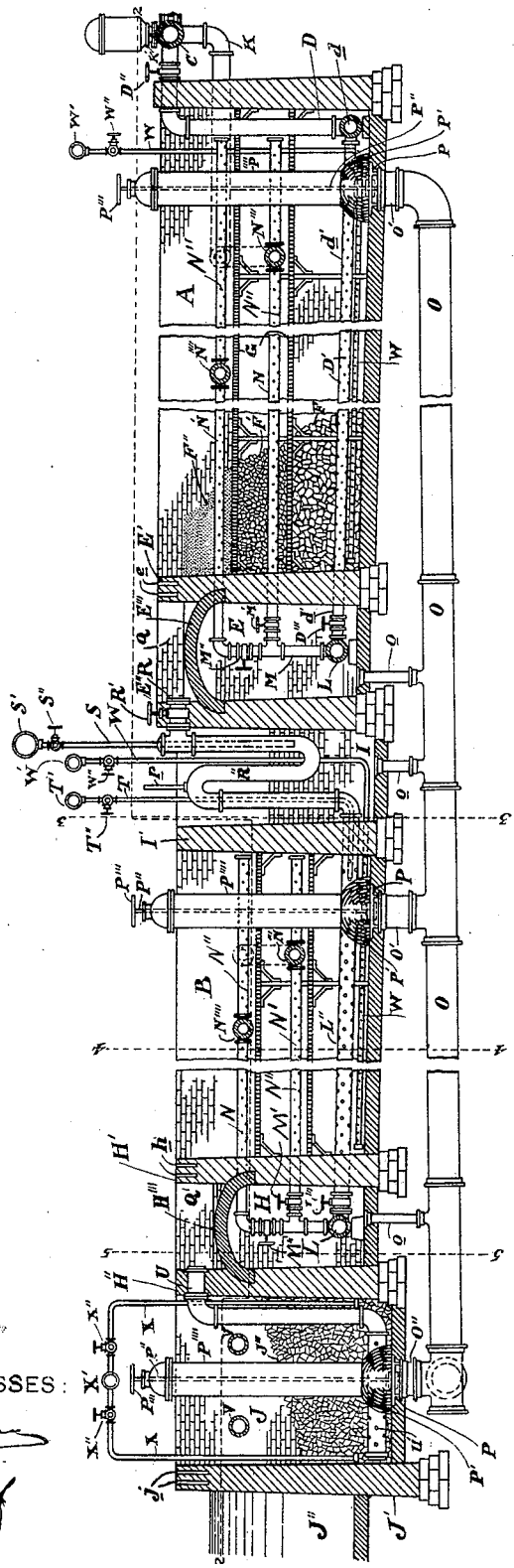
Figure 2:
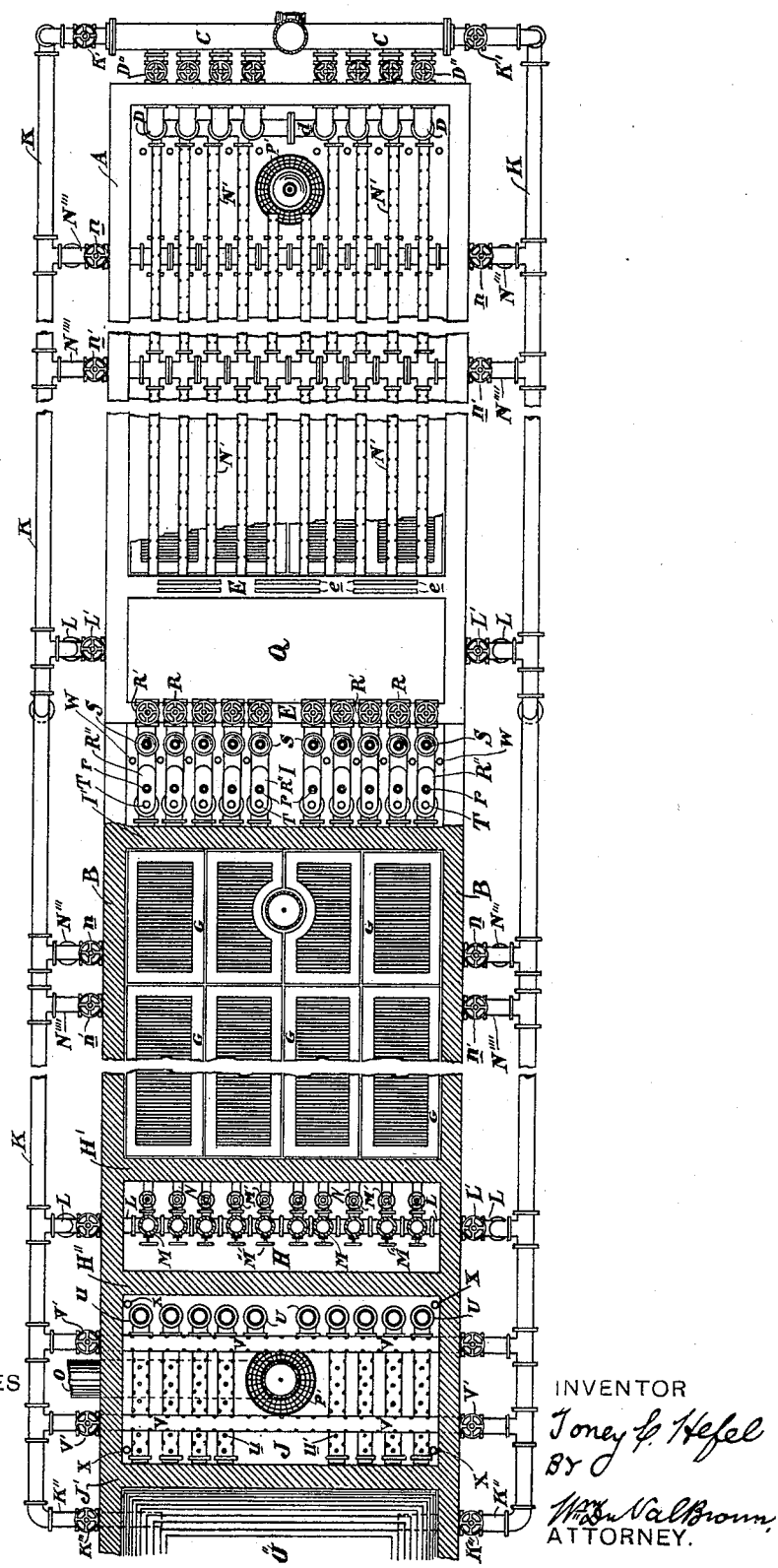
Figure 5:
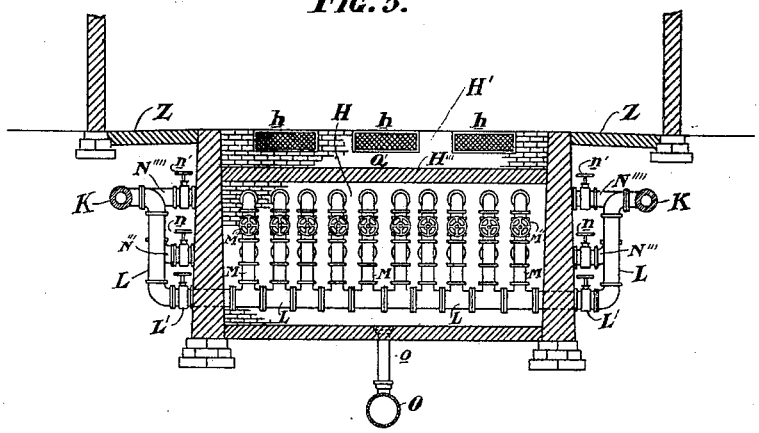
Figure 3:
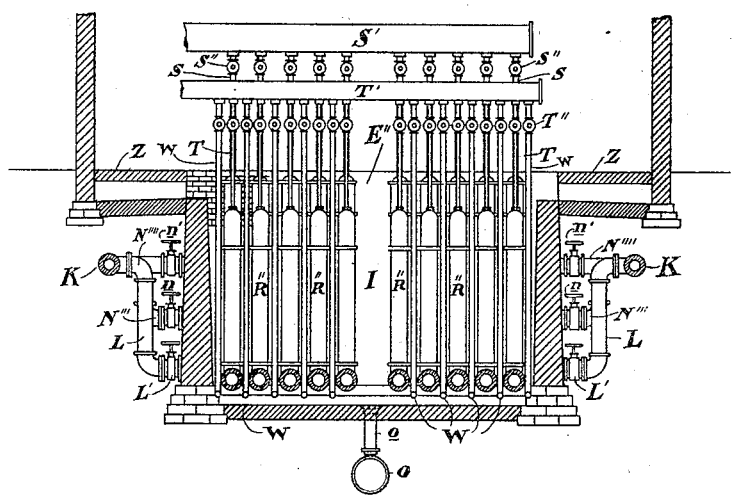
Figure 4:
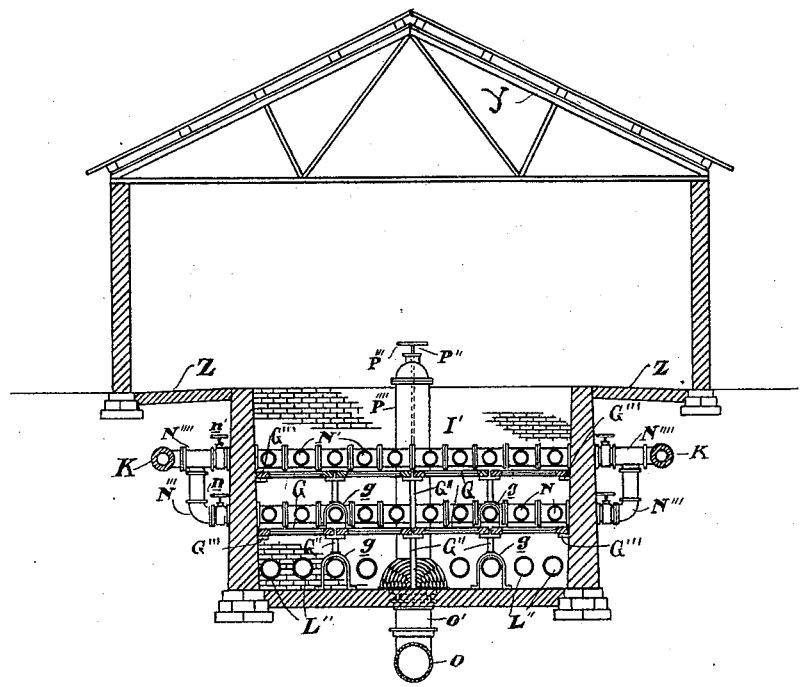
Figure 6:
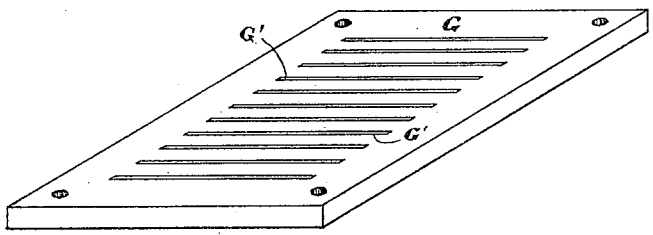
Figure 7:
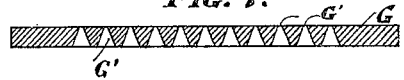

Figure 1 is a vertical longitudinal section of my complete plant, parts being in elevation. Fig. 2 is a part-horizontal section and part plan of Fig. 1 on the line 2 2. Fig. 3 is a cross-section on the line 3 3, Fig. 1. Fig. 4 is a cross-section on the line 4 4, Fig. 1, showing the housing. Fig. 5 is a cross-section on the line 5 5, Fig. 1. Fig. 6 is a detail perspective view of the dividing-plate for the filtering material, and Fig. 7 is a longitudinal section of Fig. 6.

In the drawings, A designates the first filtering-basin, and B the second filtering-basin. The water is fed into the first basin A from the pipe C, which is connected to the source of supply, which is either natural drainage or a force-pump. (Not shown.) Leading from the pipe C are a series of pipes D, which extend down to near the bottom of the basin and lead into the cross-pipe $d$, from which extend the longitudinal pipes $d'$, which extend the entire length of the basin into the chamber E, which is separated from the basin by the wall E'. The pipes $d'$ on the bottom of the basin are perforated, as shown at D', and each pipe is controlled by a valve D''.

The filtering material and arrangement of pipes are the same in each basin, so that the description of one basin will suffice for both. Arranged on the bottom of the filter is a layer of broken stone F, and above the stone is a layer of gravel F', and above the gravel is a layer of sand F''. The different layers of filtering material are separated by a series of plates G, which are provided with a series of transverse slots G'. As plainly shown in Figs. 6 and 7, these slots are in the form of an inverted V, being wide at the bottom and gradually becoming smaller at the top until they terminate in a small slit on the upper surface of the plate. By this construction the water can readily pass upward through the plates; but the shape of the slots will prevent any of the filtering material from passing through, and the material will always be separated and held in its proper position.

The chamber E, before mentioned, is formed by the wall E' and wall E'' and is covered by an arch E''', making a chamber which is shut off from the water and which is entered through a suitable door. (Not shown.) This chamber is used for a valve-chamber for flushing the basin, as hereinafter described. In the rear of the basin B is a similar valve-chamber H, formed by the walls H' and H'' and the arch H'''.

In the rear of the chamber E is a chamber I, which is formed by the walls E'' and I', and in the rear of this chamber is the filtering-basin B, before described.

In the rear of the valve-chamber H is a settling chamber or basin J, which is formed by the wall H'' and wall J', and in the rear of the wall J' is the clear-water basin J''.

Arranged on opposite sides of the filtering plant are the high-pressure pipes K, which are connected to the inlet-pipe C and controlled by the valves K'. These pipes K extend the whole length of the plant and are connected to the clear-water basin by means of the pipes K'', which are controlled by the valves K'''. When it is desirable not to use the filtering plant, as in case of a fire or other emergency, the pipes D can be closed by means of the valves D'' and the valves K' and K'''' opened, when the water will pass directly into the clear-water basin ready for use.

Extending from the pipes K are the branch pipes L, which extend down adjacent the bottom of the chambers E and H. The arrangement of pipes and valves is the same in both chambers, so a description of one arrangement in one chamber will do for both. Each pipe L is controlled by a valve L', as plainly shown in Fig. 5. The ends of the feed-pipes d' are connected to the pipe L in the chamber E, and each pipe is controlled by a valve D''', located in the chamber. The ends of the perforated feed-pipes L'' for the second filtering-basin B are also connected to the pipe L in the chamber H and controlled by the valves L''', located in the chamber.

Extending upward from the pipes L in the chambers E and H are the pipes M, and branching from these pipes M are the horizontal pipes N and N'. These pipes extend the entire length of the filtering-basins and are closed at their ends and are controlled by the valves M' and M'', respectively, which are located in the chambers. These pipes N and N' are arranged directly above the separating-plates G and are provided with the perforations N'', which are located only on the lower portions of the pipes, so that the water will be forced downward, for a purpose hereinafter described. These pipes N and N' are also connected directly to the pressure-pipes K by means of the branch pipes N''' and N'''', respectively, and these branch pipes are controlled by the valves n and n'.

The bottoms of the basins A and B incline downwardly toward their forward end. Leading from the forward end of the basin A is a drain-pipe O. This pipe O is also connected to the forward end of the basin B by means of the pipe O' and is connected to the settling-basin J by means of the pipe O''. The connection between the basin A and drain-pipe and between the pipes O' and O'' and basin B and basin J is controlled by a valve P. These valves are surrounded with a protection-screen P' and have a valve-stem p'' extending to the top of the basins, on the upper ends of which are fixed the hand-wheels P'''. The valve-stems are protected with a casing P'''', which also acts as a manhole to reach the valves.

o are drain-pipes leading from the chambers E, I, and H to the pipe O.

Arranged on top of the wall E' are the double screens e e. These screens are detachable, and if one should become clogged it could be removed, while the other remains in place. Between the walls E' and E'' and over the arch E''' is formed a basin Q. Leading from the basin Q are a series of pipes R, each pipe being controlled by a valve R'. These pipes extend down into the basin I, forming the elbows R'', and are then connected to the pipes L'' adjacent the bottom of the basin B. Extending into each pipe R is a hot-steam pipe S, as plainly shown in Figs. 1 and 3. These pipes S connect to a common steam-pipe S' and are each controlled by a valve S''. On top of the elbows are vents r to allow any air to escape which might accumulate in the pipes.

T designates compressed-air pipes leading into the top of the elbows. These pipes extend down into the elbows R'' and a short distance into the pipe L'' for a purpose hereinafter described. These pipes T are connected to a common compressed-air pipe T' and are each controlled by a valve T''.

On top of the wall H' are two detachable screens h h, and between the walls H' and H'' and over the arch H''' is formed a basin Q'. Leading from the basin Q' are a series of pipes U, which extend down adjacent the bottom of the settling-basin J and are perforated, as shown at U', Fig. 1. This basin J is partly filled with charcoal J'''.

V designates perforated pipes leading into the basin for flushing the same. When the basin is being flushed, the valve P is open, allowing the water to run out through the drain-pipe O. These pipes V are connected to the pressure-pipes K and are controlled by the valves V'. On top of the wall J' are arranged two detachable screens j, through which the water passes from the basin J into the clear-water basin J''.

The series of dividing-plates G are supported on the posts G'', which rest on the bottom of the filtering-basins and the brackets G''' on the ends of the basins and are held in place either by screws or bolts. The posts G'' have bifurcated lower ends g, which span the pipes, so that the weight of the plates will not rest on the pipes, as plainly shown in Fig. 4.

In operation the water passes from the pipe C into the pipes D, the valves K' being closed, down to the bottom of the first filtering-basin A, when it will rise up through the stone, gravel, and sand until it reaches the top of the basin, when it will pass through the screens e e into the basin Q and then into the pipes R. After entering the pipes R it passes down into the elbows R'' and is heated by the hot steam from the pipes S. In passing through the elbows it is heated sufficiently to effectually kill all germs which might be in the water. From the elbows it passes into the pipes L''. The water is forced from the elbows into the pipes L'' by means of the compressed-air currents passing through the pipes T. The water after leaving the perforated pipes L'' rises up through the filtering material in the second filtering-basin B and through the screens h h into the basin Q', and then into the pipes U to the bottom of the settling-basin J, when it will rise up through the charcoal and then through the screens j j into the clear-water basin J''. The water after passing through the two filtering-basins and settling-basin and being heated is very thoroughly filtered and all the impurities have been removed.

To more thoroughly filter the water and to help keep the filtering material clean, I provide each filtering-basin with a compressed-air pipe, placed near the bottom thereof, as plainly shown at W, Fig. 1. These pipes extend up and connect with a pipe W', which is connected to a suitable air-compressor. (Not shown.) These pipes are controlled by a valve W''. I also provide the settling-basin J with a compressed-air pipe X, one in each corner of the basin. These pipes extend upward and are connected to a common air-pipe X' and are controlled by a valve X''.

If desired, I can shut off entirely the first filtering-basin by closing the valves D'' and R' and the valves L' in the pipe L leading into the chamber E, and open the valves L' in the pipe L leading into the chamber H, and close the valves M' and M'', when the water will pass from the pressure-pipes K up through the filtering material in the second basin B and to the clear-water basin, as before described. In this case the water will not be heated, but will be filtered in one basin.

When it is desired to flush the basins, the valves D'' are turned off and the valves K' opened, and water can be admitted to the pipe L and to the pipes N and N', and also through the pipes N''' and N''''. By properly operating the valves either layer of filtering material can be flushed, or they can all be flushed together, as desired. When the flushing is being done, the water will pass away through the pipe O, the valve P being opened. As shown in Fig. 1, the drain-pipe O leads to one side of the filter and can be connected to a suction-pump if there is no natural drainage.

The number of feed-pipes and flush-pipes in the filtering-basins is not important and I can vary the number to suit the size of the plant. It will be noticed that all the valves for flushing the plant are arranged in the chambers E and H and are easily accessible. The whole plant is adapted to be covered with a roof Y and to have a walk Z on each side thereof.

It will be noticed that the flush-pipes N and N' are located directly above the plates G, and as they only have perforations on their lower portion the water will be forced down in great force, thoroughly cleaning the plates.

Having thus described my invention, what I claim as new, and desire to secure by Letters Patent, is—

1. In a filtering plant for waterworks, the combination with a filtering-basin having an inlet and outlet, a chamber at one end of the basin, flush-pipes leading from the chamber within the basin, and valves located within the chamber for controlling the pipes.

2. In a filtering plant for waterworks, the combination with a filtering-basin, of a chamber at one end of the basin, an inlet-pipe located adjacent the bottom of the basin and leading into the chamber and connected to a high-pressure pipe, and valves at both ends of the inlet-pipe so that the inlet-pipe can be used also for flushing.

3. In a filtering plant for waterworks, the combination with a filtering-basin, filtering material in the basin, perforated plates separating the material into layers, and flush-pipes extending the length of the basin and located just above the plates.

4. In a filtering plant for waterworks, the combination with filtering-basins, pipes connecting the basins, means for heating the water as it passes from one basin to the other in the pipes, and a compressed-air pipe leading into the connecting-pipes for forcing the water through the said pipes.

5. In a filtering plant for waterworks, the combination with a filtering-basin, an inlet-pipe leading into the bottom of the basin, an outlet at the top of the basin leading into a basin Q, pipes leading from the said basin into the bottom of a second filtering-basin, means for heating the water in the said pipes, an outlet at the top of the second filtering-basin leading into the basin Q', pipes leading from the said basin into the settling-basin and an outlet from the settling-basin to the clear-water basin.

6. In a filtering plant for waterworks, the combination with a filtering-basin, of a settling-basin, pipes connecting the basins, charcoal placed in the settling-basin, and a compressed-air pipe leading into the settling-basin.

In testimony whereof I affix my signature in the presence of two witnesses.

TONEY C. HEFEL.

Witnesses:
   THOS. L. RYAN,
   WM. DU VAL BROWN.